(12) United States Patent
Stock et al.

(10) Patent No.: US 10,553,914 B2
(45) Date of Patent: Feb. 4, 2020

(54) RAPID FORMING OF AN ELECTRODE

(71) Applicant: Bayerische Motoren Werke Aktiengesellschaft, Munich (DE)

(72) Inventors: Christoph Stock, Munich (DE); Byron Konstantinos Antonopoulos, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/862,798

(22) Filed: Jan. 5, 2018

(65) Prior Publication Data

US 2018/0131046 A1    May 10, 2018

Related U.S. Application Data

(63) Continuation of application No. PCT/EP2016/064935, filed on Jun. 28, 2016.

(30) Foreign Application Priority Data

Jul. 6, 2015   (DE) .......................... 10 2015 212 590

(51) Int. Cl.
| | |
|---|---|
| *H01M 4/02* | (2006.01) |
| *H01M 10/44* | (2006.01) |
| *H01M 4/133* | (2010.01) |
| *H01M 4/38* | (2006.01) |
| *H01M 10/0525* | (2010.01) |
| *H01M 10/058* | (2010.01) |

(52) U.S. Cl.
CPC ........... *H01M 10/44* (2013.01); *H01M 4/133* (2013.01); *H01M 4/382* (2013.01); *H01M 10/058* (2013.01); *H01M 10/0525* (2013.01)

(58) Field of Classification Search
CPC ...................................................... H01M 4/02
See application file for complete search history.

(56) References Cited

U.S. PATENT DOCUMENTS

| | | |
|---|---|---|
| 2002/0034678 A1 | 3/2002 | Shibuya et al. |
| 2010/0148731 A1 | 6/2010 | Notten et al. |
| | (Continued) | |

FOREIGN PATENT DOCUMENTS

| | | |
|---|---|---|
| JP | 2001-325988 A | 11/2001 |
| JP | 2011-108550 A | 6/2011 |
| | (Continued) | |

OTHER PUBLICATIONS

International Search Report (PCT/ISA/210) issued in PCT Application No. PCT/EP2016/064935 dated Aug. 3, 2016 with English translation (five pages).

(Continued)

*Primary Examiner* — Jacob B Marks
(74) *Attorney, Agent, or Firm* — Crowell & Moring LLP

(57) ABSTRACT

A method for forming a negative electrode for a lithium-ion cell includes the following steps: first constant-current charging with a first charging current until a first half-cell potential versus a reference electrode is reached, first constant-voltage charging at the first half-cell potential versus the reference electrode until a second charging current is reached, second constant-current charging with the second charging current until a second half-cell potential versus the reference electrode is reached, second constant-voltage charging at the second half-cell potential versus the reference electrode until a final charging current is reached.

8 Claims, 2 Drawing Sheets

(56) References Cited

U.S. PATENT DOCUMENTS

| | | | |
|---|---|---|---|
| 2011/0037439 A1* | 2/2011 | Bhardwaj | H01M 4/13 320/152 |
| 2013/0043843 A1 | 2/2013 | Amiruddin et al. | |
| 2014/0084849 A1 | 3/2014 | Lee et al. | |
| 2015/0060290 A1 | 3/2015 | Xu | |
| 2015/0357678 A1* | 12/2015 | Tsubouchi | H01M 10/0525 429/200 |

FOREIGN PATENT DOCUMENTS

| | | |
|---|---|---|
| JP | 2015-230789 A | 12/2015 |
| WO | WO 2008/154956 A1 | 12/2008 |

OTHER PUBLICATIONS

German-language Written Opinion (PCT/ISA/237) issued in PCT Application No. PCT/EP2016/064935 dated Aug. 3, 2016 (six pages).

German-language Search Report issued in counterpart German Application No. 10 2015 212 590.4 dated Mar. 10, 2016 with partial English translation (13 pages).

International Search Report (PCT/ISA/210) issued in PCT Application No. PCT/EP2016/064944 dated Aug. 3, 2016 with English translation (4 pages).

German-language Written Opinion (PCT/ISA/237) issued in PCT Application No. PCT/EP2016/064944 dated Aug. 3, 2016 (6 pages).

German-language Search Report issued in counterpart German Application No. 10 2015 212 591.2 dated Mar. 10, 2016 with partial English translation (12 pages).

Andre et al., "Future Generations of Cathode Materials: an Automotive Industry Perspective", Journal of Materials Chemistry A, Feb. 9, 2015 (24 pages).

Abraham et al., "Performance Degradation of High-Power Lithium-Ion Cells—Electrochemistry of Harvested Electrodes", Journal of Power Sources, 2007, pp. 465-475, vol. 170.

Vetter et al., "Ageing Mechanisms in Lithium-Ion Batteries", Journal of Power Sources, 2005, pp. 269-281, vol. 147.

Japanese Office Action issued in Japanese counterpart application No. 2018-500360 dated Sep. 30, 2019, with partial English translation (Five (5) pages).

* cited by examiner

RAPID FORMING OF AN ELECTRODE

CROSS REFERENCE TO RELATED APPLICATIONS

This application is a continuation of PCT International Application No. PCT/EP2016/064935, filed Jun. 28, 2016, which claims priority under 35 U.S.C. § 119 from German Patent Application No. 10 2015 212 590.4, filed Jul. 6, 2015, the entire disclosures of which are herein expressly incorporated by reference.

This application contains subject matter related to U.S. application Ser. No. 15/862,792, entitled "Forming an Electrode" filed on even date herewith.

BACKGROUND AND SUMMARY OF THE INVENTION

The invention relates to a method for forming a negative electrode for a lithium-ion cell.

The interface between the negative electrode of a lithium-ion cell has a significant influence on the properties and the behavior of the cell. The negative electrode in lithium-ion cells is at electrochemical potentials of <250 mV with respect to the $Li/Li^+$ reference electrode; see, for example, Andre et al., J. Mater. Chem. A (2015), 6709-6732 or Abraham et al., Journal of Power Sources 170 (2007), 465-475. Since common electrolytes are unstable at such low potentials with respect to reduction, they react at the electrode interface and a layer, what is known as the SEI (solid electrolyte interphase) layer, is formed on the negative electrode. In this case, both lithium charge carriers are irreversibly consumed (loss of capacitance) and the ion transport of lithium ions is inhibited (power loss).

In the case of a suitable selection of electrolytes, the products of the electrolyte reduction are passivating, with the result that, after the formation of a closed layer, a further reduction in the sense of a self-regulating effect is prevented (electrical insulation); see, for example, Vetter et al., Journal of Power Sources 147 (2005), 269-281.

Ideally, the SEI is a perfect electrical insulator (suppressed, i.e. completely passivated electrolyte reduction) and at the same time a perfect Li-ion conductor. This covering layer is produced when the negative electrode is first charged, which is also referred to as forming or formation. The first charging, i.e. the first intercalation of lithium ions in graphite (in the case of a graphite anode as negative electrode) takes place parallel to the construction of the SEI covering layer. The exact forming conditions are important for the formation of the SEI covering layer. In addition to the selection of chemical components, such as the electrolyte, for example, the properties of the covering layer, such as the permeability for lithium ions, the aging behavior or the stability of the layer, for example, are dependent on said forming conditions. In order to achieve the most advantageous properties of the covering layer, forming takes place with low current load in accordance with the prior art. A time-efficient forming profile can be found, for example, in US 20150060290 A1. In particular, forming profiles are cyclically repeated in accordance with the prior art in order to achieve optimum forming success.

It is an object of the invention to provide an improved method for forming a graphite anode for a lithium-ion cell.

This and other objects are achieved by a method for forming a negative electrode for a lithium-ion cell, comprising the steps of: first constant-current charging with a first charge current until a first half-cell potential of the negative electrode with respect to a reference electrode is reached; first constant-voltage charging at the first half-cell potential with respect to the reference electrode until a second charge current is reached; and second constant-current charging with the second charge current until a second half-cell potential with respect to the reference electrode is reached. Advantageous embodiments and further developments of the invention are described and claimed herein.

According to the invention, the method comprises the step of first constant-current charging with a first charge current until a first half-cell potential of the negative electrode with respect to a reference electrode is reached, the further step of first constant-voltage charging at the first half-cell potential with respect to the reference electrode until a second charge current is reached, and the further step of second constant-current charging with the second charge current until a second half-cell potential with respect to the reference electrode is reached.

A forming method comprising the described forming steps is thus proposed. The effects of these forming steps interlock in such a way that forming time is saved, i.e. the forming can be carried out in an even more time-efficient manner. In addition, fewer coulombic losses occur, with the result that the reversible capacitance of the overall cell is increased. The forming profile according to the invention is to be carried out once; cyclic, multiple forming is unnecessary.

This is due to the comparatively "rapid" passage of high potential ranges at the beginning of the forming. The formation of the SEI covering layer is directly influenced by the electrical potential during the forming. The formation thereof takes place during the forming of two reaction steps, namely a first reaction step at about 700 mV with respect to the $Li/Li^+$ reference electrode (in the case of a graphite anode as negative electrode), in which a primary SEI covering layer (precursor of the SEI covering layer) is formed, and a second reaction step starting from about 400 mV with respect to the $Li/Li^+$ reference electrode (in the case of a graphite anode as negative electrode), in which the SEI covering layer is formed completely. The primary SEI covering layer already has passivating properties. Said precursor of the SEI covering layer is then reduced to form the final secondary SEI in a second reaction step. A very slow passage of the upper potential ranges leads to an extensive formation of the primary SEI covering layer. This leads to an impeded reduction of lithium at the electrode, that is to say in the case of a graphite electrode as negative electrode leads to a difficult intercalation of lithium into the graphite layers.

If the forming potential remains at high values for a very long time on account of a low current, an even thicker primary SEI covering layer is formed, i.e. an even thicker primary SEI covering layer must also be further reduced in the second step to form the secondary, i.e. completely formed, SEI covering layer. It has been found, however, that the degree of embossing of the primary SEI covering layer has an influence on the later secondary SEI covering layer. This is presumably due to the fact that a thick primary SEI covering layer is only partially developed further to form the secondary SEI covering layer and thus partially remains.

The primary SEI covering layer in turn hinders the intercalation of lithium ions. Consequently, the primary SEI covering layer must first be completely converted into a secondary SEI covering layer by repeated forming and thus repeatedly passing through the second reaction step with loss of capacitance (irreversible consumption of active material) in order to eliminate the inhibitory effect of the primary layer. In addition to the unnecessary loss of capacitance, a secondary SEI covering layer remains, which is likewise not advantageous in the thickness obtained. An SEI layer that is too thick leads to an unnecessarily high charge transfer resistance for the lithium ions during the operation of the Li-ion cell and involves a loss of power.

The method according to the invention has the advantage that direct forming of the secondary SEI covering layer in a forming operation can be achieved as far as possible by the steps according to the invention. This is effected by a first constant-current charging with the first charge current reaching the second reaction step faster and subsequent potentiostatic recharging. Due to the resulting slight forming of the primary SEI covering layer due to the rapid reaching of the potential of the second reaction step (by constant-current charging) it is possible to save both coulombic losses or capacitance losses during forming and forming time in the form of unnecessary further cycles. Moreover, the internal resistance can also be reduced. Lower overpotentials resulting therefrom allow a higher power and a higher energy efficiency of the cell. The method according to the invention is also referred to as rapid forming.

Furthermore, it is expedient if a further step exists in a second constant-voltage charging at the second half-cell potential with respect to the reference electrode until a final charge current is reached.

According to another variant of the invention, the first charge current is at least one fifth of the one-hour current. The one-hour current, 1 C, represents the current at which the rated capacitance of the cell is taken in charging within 1 hour under nominal conditions. Multiples of this one-hour current are referred to as multiples of the C rate.

At a current that is therefore at least 0.2 C, the phase of the primary SEI covering layer formation is rapidly passed through. The half-cell potential with respect to a reference electrode drops sufficiently rapidly during the constant-current charging, for example in the case of a graphite anode as an electrical electrode, in order to be able to maintain the charge current.

It is furthermore advantageous if the first half-cell potential is 150-800 mV with respect to the Li/Li$^+$ reference electrode. A transition is then made from galvanostatic to potentiostatic charging. Depending on the electrode material at the negative electrode, the value of the first half-cell potential coincides with the potential at which the second reaction step takes place for complete formation of the SEI covering layer. In the case of a graphite anode, this value is approximately between 200 mV and 400 mV.

It is also advantageous if the second charge current is selected to be lower than the first charge current. The potential in the second reaction step acts on the electrode for an appropriately long time, before the second charge current is reached.

With the second charge current, the electrode is finally galvanostatically recharged until the second half-cell potential with respect to the Li/Li$^+$ reference electrode is reached, wherein the second half-cell potential is lower than the first half-cell potential. The forming process is completed with a potentiostatic charging process at the second half-cell potential until the cell reaches a time criterion, for example 1 h, or a final current consumption, for example 0.05 C.

It is also advantageous in the invention that a defined state of charge can also be set with the rapid forming. In conventional forming according to the prior art, the forming usually consists of several, at least one, whole full cycle, i.e. a discharging and charging process over a state of charge interval of more than 80% of the rated capacitance in each case. After the forming is defined as complete (that is to say after at least one full cycle), a defined state of charge at the level of approximately 50% state of charge (relative charge state) is usually to be set before delivery for transport and storage until the first use of the cell. Thus, in addition to the full forming cycles, an approximately ¼ cycle has to be additionally carried out in order to achieve the defined state of charge. The total number of cycles is thus increased to 1.25+n (n=0, 1, 2, ...) with n as the number of full forming cycles. The rapid forming method is also suitable for setting a predetermined state of charge in addition to rapid forming. For this purpose, the second half-cell potential with respect to a reference electrode is selected such that the resulting voltage of the entire lithium-ion cell already corresponds to the desired state of charge. The minimum number of cycles required for forming and state of charge setting is thus reduced to approximately half a charging cycle, i.e. 0.25 full cycles.

The invention is based on the considerations illustrated below.

The negative electrode in Li-ion batteries, in particular a graphite anode, is at electrochemical potentials <250 mV vs. Li/Li$^+$. Anodes made of SiC composites or pure silicon have even lower potentials.

Since common electrolytes are unstable at such low potentials with respect to reduction, they react at the electrode interface. In this case, both Li charge carriers are irreversibly consumed (loss of capacitance) and the ion transport is inhibited (power loss). In the case of a suitable selection of electrolytes, the products of the electrolyte reduction are passivating, with the result that, after the formation of a closed layer, a further reduction in the sense of a self-regulating effect is prevented (electrical insulation).

The reduced layer is referred to as a solid electrolyte interphase (SEI). Ideally, the SEI is a perfect electrical insulator (suppressed, i.e. completely passivated electrolyte reduction) and at the same time a perfect Li-ion conductor.

It has been found that the reduction of carbonate-containing electrolytes of today's generation according to the prior art to form an SEI (what is known as formation) proceeds in two steps. In the first step, at potentials of ~700 mV vs. Li/Li$^+$, organic substances, such as polymers, esters, ethers, alkyl carbonates and polyolefins, for example, are formed. This organic SEI is already passivating given suitable forming parameters. In a second step, at ~400 mV vs. Li/Li$^+$, these organic structures are further reduced to inorganic substances ($Li_2CO_3$, $Li_2O$, LiF).

Cell manufacturers use galvanostats (what are known as cyclers) for forming cells for a wide variety of reasons. These act as a dynamic constant-current source while the voltage is measured across the cell poles. After the production of cells and, in particular, after the filling of the electrolyte, the cells are cycled, i.e. charged and discharged, at the cycler at a constant current rate (generally C/10, corresponding to capacitance [Ah]/10 h). After a first cycle, some of the SOC (state of charge) ranges and waiting times between charging/discharging phases are varied.

A disadvantage of this is that Li-ion charge carriers are consumed during the forming of the SEI, which charge carriers are then no longer available for cycling. In today's cells, the forming of the SEI consumes about 10% of the originally available capacitance. Furthermore, their stability with regard to calendar and cyclic aging, their thermal behavior and also the internal resistances of the cell caused by them are dependent on a multiplicity of parameters during and after the forming. The development of lifetime and impedance of the SEI will often contribute decisively to the lifetime of the entire cell. An optimization of the SEI properties can accordingly contribute significantly to the lengthening of Li– ion cells.

It is therefore proposed to apply a dynamic current profile, in particular during the first forming cycle, in order to pass through higher potential ranges of the anode more rapidly and certain potential ranges more slowly. Here, it is recommended, in particular in the first cycle, to pass through potential ranges with only low Li intercalation (>400 mV vs. Li/Li+) more rapidly.

In this regard, it is advantageous that a slow passage of high potential ranges leads to impeded Li intercalation during the first cycles and that, during the forming, the SEI undergoes two reaction steps at potentials of about 700 and 400 mV vs. Li/Li+, wherein the primary SEI (700 mV) already has passivating properties. This SEI is then reduced in a second reaction step to form the final secondary SEI.

If the potential now remains at high values for a very long time on account of the slow current rate, much of the primary SEI is formed without this being further reduced to form the preferred secondary SEI. The primary SEI in turn hinders the intercalation of Li charge carriers. As a result, the primary SEI must first be converted to a secondary SEI under further capacitance losses before uninhibited Li intercalation can take place.

This may require a higher number of forming cycles. Both coulombic losses in the first cycle and forming time in the form of further cycles can be saved by direct forming of primary SEIs by rapidly reaching the trigger potential.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
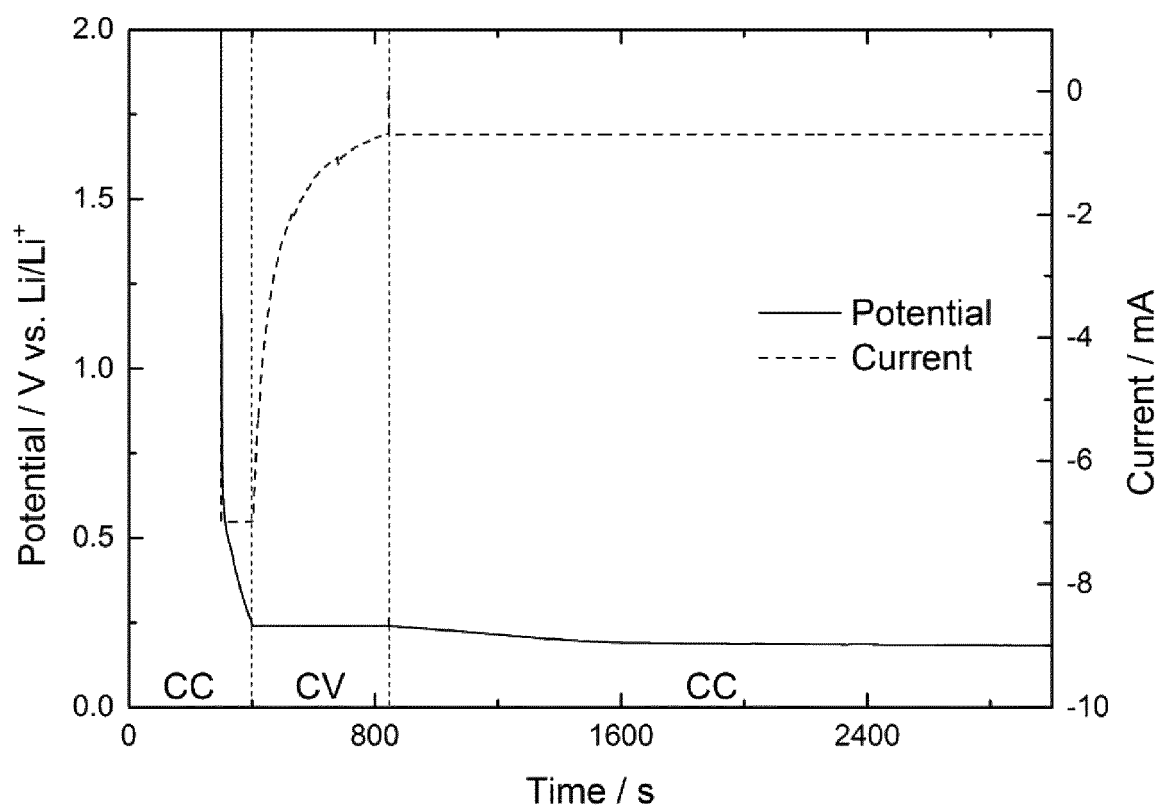
FIG. 1 schematically shows a forming profile according to the invention: potential and current profile of a negative electrode for a lithium-ion battery.
Figure 2:
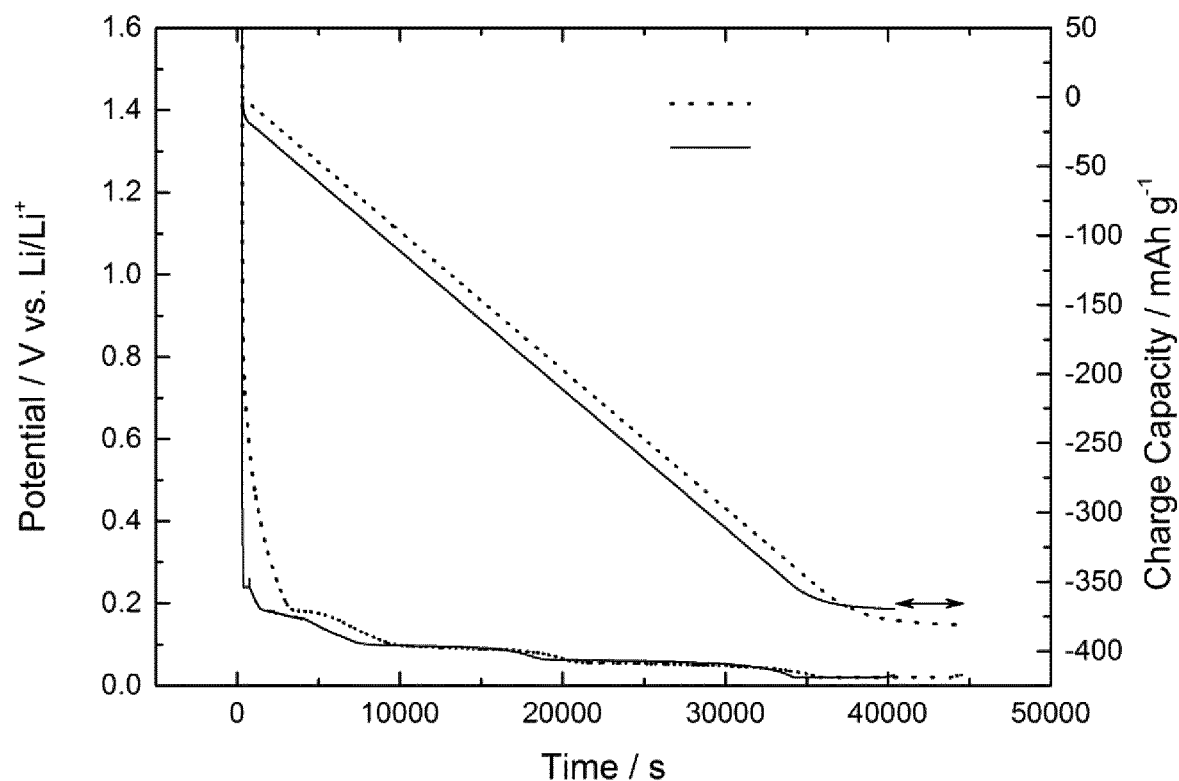
FIG. 2 schematically shows a forming profile according to the invention: potential and charge capacity profile of a negative electrode for a lithium-ion battery.

FIG. 1 shows a section of the profile of potential and charge current of a negative electrode as a half cell with respect to time in the rapid forming according to the invention. A half cell with a graphite anode as negative electrode is assumed. The charge current is plotted on the right-hand high-value axis as negative current; a discharge current carries a positive sign. In addition to the potential profile during rapid forming (solid line), FIG. 2 also shows the potential profile during forming according to the prior art (dashed line) with continuous constant-current charging with 0.1 C up to a half-cell potential of 20 mV vs. Li/Li+ and subsequent constant-voltage charging at the same potential up to a termination current of 0.05 C. Furthermore, FIG. 2 shows the relative gravimetric charge capacity on the right-hand high-value axis, i.e. the charge capacity relative to the weight of the active material graphite.

First, galvanostatic charging is started at a current rate of 1 C ("CC", constant current). In the example, the rate 1 C is the magnitude after about 7 mA. This is due to the chosen example, in which the specific capacitance of the active material results in a total computational capacitance of the electrode used of about 7 mAh. The potential decreases rapidly until a value of 240 mV with respect to the Li/Li+ reference electrode is achieved. At this potential, potentiostatic recharging ("CV", constant voltage) is carried out, with the result that the charge current decreases in magnitude. At the limit current of 0.1 C, i.e., the magnitude at about 0.7 mA in the selected example, galvanostatic charging at 0.1 C again takes place. This is continued until the potential drops to a value of 20 mV (not shown in FIG. 1 but shown in FIG. 2 at a time stamp of approximately 34,000 seconds). The process is finalized with galvanostatic charging at this value until a final charge current is reached. In the exemplary embodiment, said final charge current is 0.05 C, that is to say approximately 0.35 mA, and is reached after approximately 40,000 seconds.

It can be seen from the right-hand high-value axis in FIG. 2 that the same final charge current at the level of 0.05 C for a similar electrode is reached approximately 5000 seconds later than in rapid forming (see double arrow in FIG. 2) and the charged charge capacity is approximately 10 mAh/g higher. This higher value of charge capacity represents irreversibly consumed lithium ions, which are no longer available in the form of a capacitance loss after the forming. Since the irreversible losses in the first cycle for normal forming are about 30 mAh, the rapid forming leads to a reduction of these losses by about 35%. Thus, the rapid-forming method according to the exemplary embodiment provides, in a shorter time, a completely formed electrode having a lower initial loss of capacitance during forming.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for forming a negative electrode for a lithium-ion cell, the method comprising the steps of:
   first constant-current charging with a first charge current until a first half-cell potential of the negative electrode with respect to a reference electrode is reached;
   first constant-voltage charging at the first half-cell potential with respect to the reference electrode until a second charge current is reached; and
   second constant-current charging with the second charge current until a second half-cell potential with respect to the reference electrode is reached,
   wherein the first half-cell potential is 150-800 mV with respect to the Li/Li+ reference electrode.

2. The method as claimed in claim 1, further comprising the step of:
   second constant-voltage charging at the second half-cell potential with respect to the reference electrode until a final charge current is reached.

3. The method as claimed in claim 1, wherein the first charge current is at least one fifth of the one-hour current.

4. The method as claimed in claim 2, wherein the first charge current is at least one fifth of the one-hour current.

5. The method as claimed in claim 1, wherein the second charge current is lower than the first charge current.

6. The method as claimed in claim 2, wherein the second charge current is lower than the first charge current.

7. The method as claimed in claim 1, wherein
the second half-cell potential with respect to the reference electrode is lower than the first half-cell potential with respect to the reference electrode.
8. The method as claimed in claim 6, wherein
the second half-cell potential with respect to the reference electrode is lower than the first half-cell potential with respect to the reference electrode.

\* \* \* \* \*